United States Patent [19]

Gramespacher et al.

[11] 4,040,316
[45] Aug. 9, 1977

[54] LATHE BED

[75] Inventors: Herbert Gramespacher; Armin Feisel, both of Schaffhausen, Switzerland

[73] Assignee: Georg Fischer Aktiengesellschaft, Switzerland

[21] Appl. No.: 667,353

[22] Filed: Mar. 16, 1976

[30] Foreign Application Priority Data

Mar. 27, 1975 Switzerland .................. 3950/75

[51] Int. Cl.² .............................................. B23B 17/00
[52] U.S. Cl. .................................... 82/32; 408/234
[58] Field of Search ........................... 82/32; 408/234

[56] References Cited

U.S. PATENT DOCUMENTS

| | | | |
|---|---|---|---|
| 2,049,394 | 7/1936 | Johnson | 82/32 |
| 2,363,195 | 11/1944 | Nolan | 82/32 |
| 2,859,643 | 11/1958 | McIver | 82/32 X |
| 3,785,227 | 1/1974 | Wolff | 82/32 X |
| 3,800,636 | 4/1974 | Zagar | 82/32 |

OTHER PUBLICATIONS

A.P.C. Application of J. Wilberz, Ser. No. 358,562, published June 8, 1943.

*Primary Examiner*—Leonidas Vlachos
*Attorney, Agent, or Firm*—Roylance, Abrams, Berdo & Kaul

[57] ABSTRACT

A lathe bed includes a steel reinforced concrete body with a torsionally flexible frame and means for rigidly connecting the ends of the frame to the body. The frame includes track members for a tool carrier. In one embodiment, the frame is made of two elongated box-like side members and two transverse column guide members, the side members being fixedly attached as by screws to the concrete body and the column guide members being fixedly attached to the side members. In another embodiment, one side member is used and the two column members extend between the side member and a wall portion of the body at the other end. The body is shaped to permit clearance for turnings removed from a workpiece and for a multiple tool magazine. The headstock, feed drive, longitudinal slides and tailstock are mounted on the frame. The body contributes rigidity to the otherwise torsionally flexible frame to produce a rigid and sturdy unitary lathe bed.

5 Claims, 7 Drawing Figures

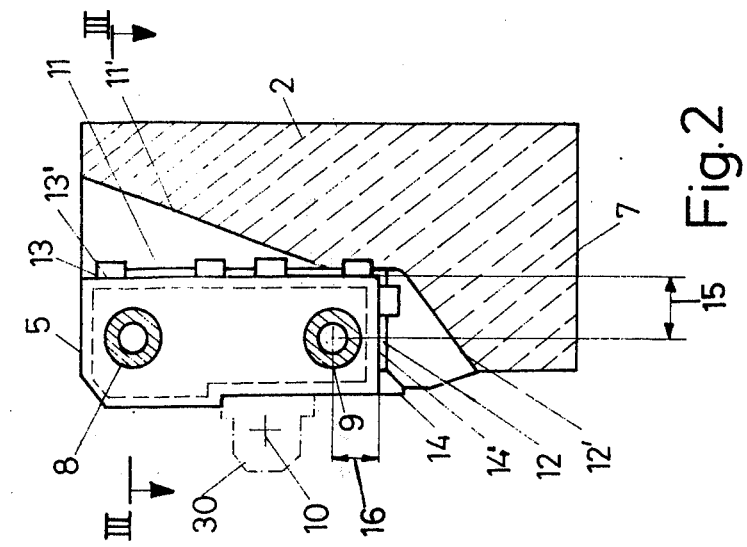
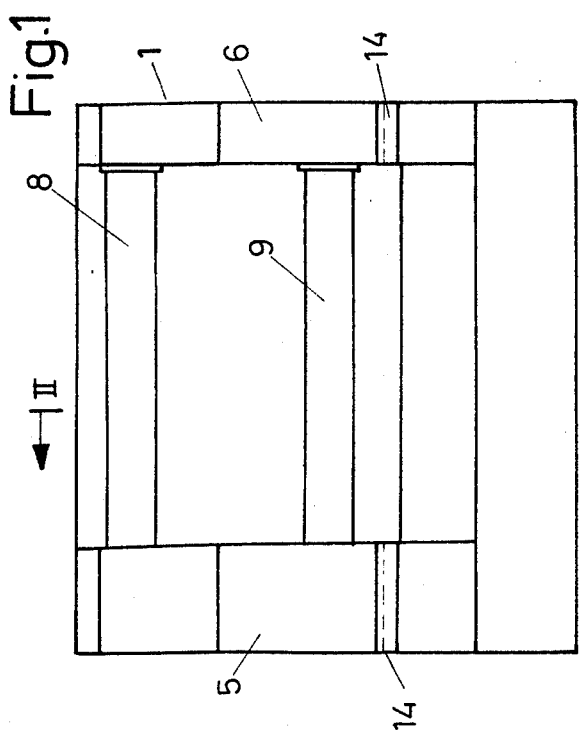
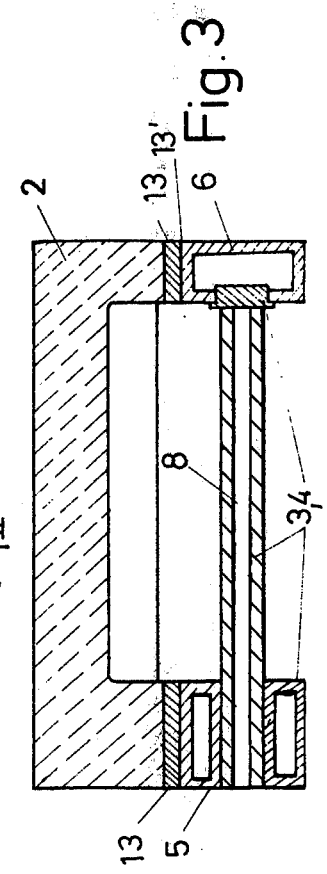

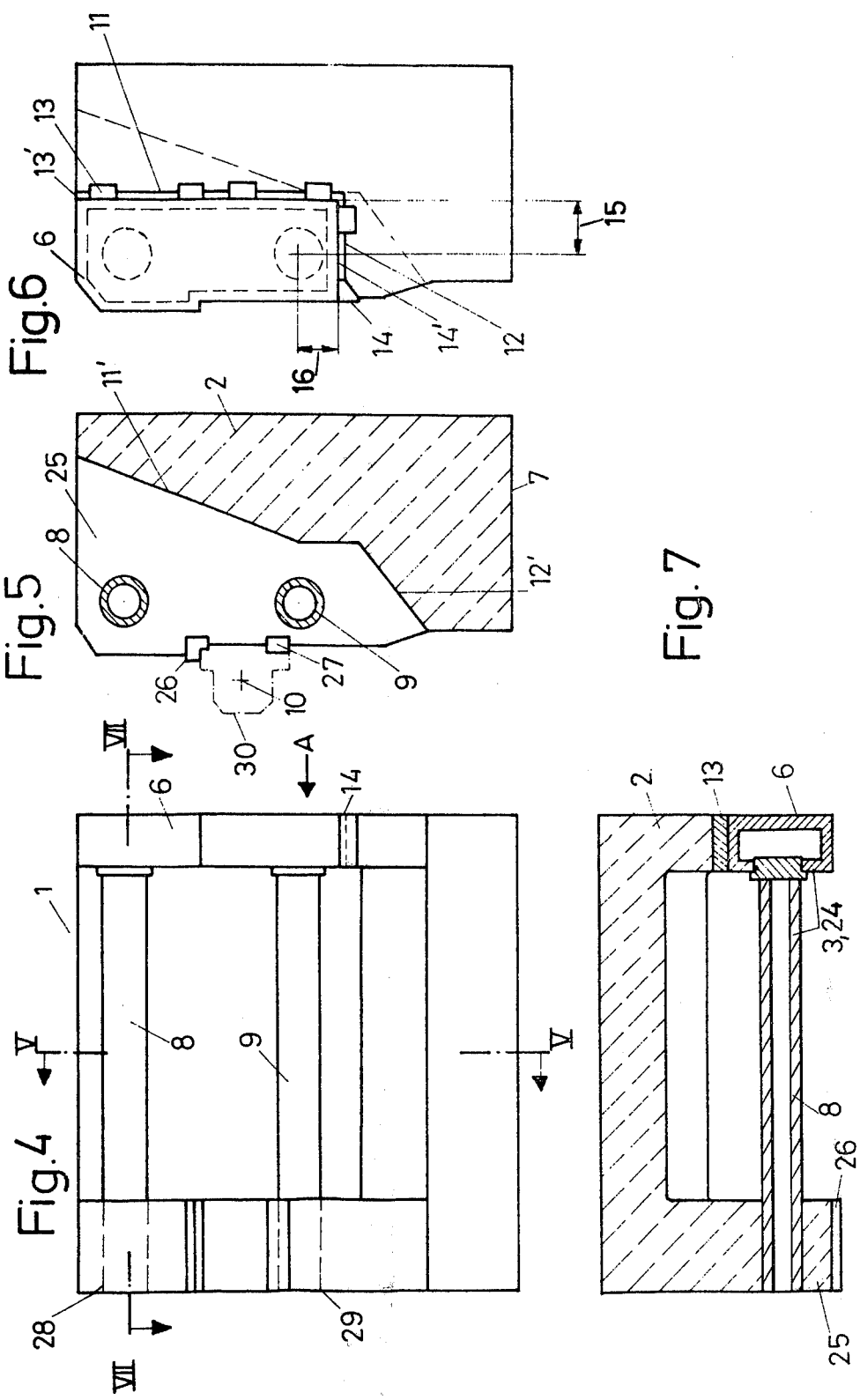

4,040,316

LATHE BED

This invention relates to a lathe bed.

BACKGROUND OF THE INVENTION

In a prior art device shown in German Auslegungsschriften No. 2,256,029, there is proposed a track member which comprises a rigid hollow metal member which is adhered to the entire surface area of a concrete supporting body. While this structure employs the concept of providing a concrete body to add to the structural strength and rigidity of a metal frame, it has the disadvantage that the rigid hollow body required in this structure must have a rather large cross-section so that the ratio of the weight of the metal part to the weight of the concrete structure is relatively large, resulting in he fact that the good itnernal damping and the cost advantages of concrete compared with metal are not adequately utilized.

BRIEF SUMMARY OF THE INVENTION

Accordingly, an object of the present invention is to provide a structure in which the concrete supporting body is as close as possible to the flux of force in the track structure and in which the ratio of the weight of the concrete to the weight of the metal portion of the track structure is increased, thereby obtaining a maximum dynamic rigidity of the bed at low cost.

A further object is to provide a lathe bed wherein the track structure is in itself not torsionally stiff, but in which the combination of the metal track structure with the bed is rigid and torsionally stiff as a result of rigid connection at the ends of the track and frame structure with the concrete supporting body.

Briefly described, the invention includes a lathe bed comprising a concrete supporting body, a torsionally flexible frame having two ends, the frame including means defining track members for supporting and guiding a tool carrier and means for rigidly connecting both ends of the frame to the body.

In order that the manner in which the foregoing and other objects are attained in accordance with the invention can be understood in detail, reference is made to the following drawings which form a part of this specification and wherein:

FIG. 1 is a front elevation of a first embodiment of a lathe bed according to the invention;

FIG. 2 is an end elevation, in section, along lines II—II of FIG. 1;

FIG. 3 is a plan view, in partial section, along lines III—III of FIG. 2;

FIG. 4 is a front elevation of a second embodiment of a lathe bed according to the inventor;

FIG. 5 is a side elevation, in partial section, along lines V—V of FIG. 4;

FIG. 6 is a side elevation of the embodiment of FIG. 4 as seen in the direction of arrow A; and FIG. 7 is a plan view, in section, along lines VII—VII of FIG. 4.

Referring first to the embodiment of FIGS. 1-3, it will be seen that the lathe bed 1 includes a concrete supporting body 2, which is preferably formed of steel-reinforced concrete, having a track structure 3 comprising a frame 4 which is, by itself, not a torsionally rigid structure. Frame 4 is in the form of a closed rectangle and comprises side members 5 and 6, each of which is an elongated member having a box-type structure, being generally rectangular in cross-section and hollow. The frame also includes intermediate column guide members 8 and 9 which, in the installed and aligned position, extend into and are rigidly connected to side member 5 and threadedly engage side member 6, the column guides each having an end member which is externally threaded and which engages internally threaded openings in the interior walls of side member 6. The two column guide members 8 and 9, which are preferably constructed as cylindrical or tubular guide members, are approximately superimposed, member 8 being above member 9, and thereby form, with the axis of rotation 10 of the workpiece, a triangular arrangement insuring unimpeded clearance for the turnings which will be removed by a cutting tool from the workpiece supported and rotated on the lathe bed.

As seen in FIG. 2, the height or vertical dimension of the concrete body 2 is such that the upper portion of the body extends above the upper column guide member 8 and the lower portion of the body extends below and laterally beyond the column guide member 9. Thus, the body is a torsionally stiff L-shaped supporting body with a large base support portion 7.

On vertical surfaces 11 and horizontal surfaces 12 at opposite ends of the supporting body, there are provided metal seating shoulders 13 and 14, the shoulders being imbedded in the concrete and anchored thereto by screws. Seating shoulders 13 and 14 form supporting surfaces 13' and 14' which are perpendicular to each other and which are aligned with each other by a cutting process such as milling after being attached to the concrete support body. In the midportion of the support body in the vicinity of column guide members 8 and 9, surface 12' is inclined with respect to the vertical to provide better clearance for the turnings produced in the cutting process. A rearwardly inclined in 11' provides a sufficiently large free area between column guide 8 and body 2 for the arrangement of a relatively large tool magazine on the longitudinal slides.

Frame 4 with its two sides 5 and 6 lying on surfaces 13' and 14' is rigidly connected with body 2, this rigid connection preferably being accomplished using screws. All assemblies such as the headstock, feed drive, longitudinal slides and tailstock, which contribute to and are located in the cutting flux of force are arranged on frame 4.

Due to the construction of the track member as a frame which is not in itself rigid, the dimensions of the two sides can be made as small as possible, so that the distances indicated at 15 and 16 of column guides 8 and 9 from support surfaces 13' and 14' are also small. Consequently, the concrete body 2, which has a highly effective vibration damping action, can be brought as close a possible to the source of forces in the track structure.

FIG. 4–7 show a second embodiment of a lathe bed according to the invention wherein the track structure 3 is constructed as a frame 24 which is, considered by itself, open on one side and which includes a single box-like side 6 with two column guides 8 and 9, again preferably in the form of circular guides, arranged thereon.

On the headstock side, body 2 is provided with a projection 25 which is in the nature of a projecting wall and which is provided with two openings 28 and 29. Column guides 8 and 9 extend into openings 28 and 29, respectively, and are directly and rigidly connected to body 2 in an aligned position. At the other end, members 8 and 9 are again fixedly attached to side member 6 which lies on surfaces 13' and 14' and is rigidly connected with body 2. As will be seen, the construction of the supporting body 2 otherwise and the attachment of column guides 8 and 9 and members 6 to the body corresponds to the construction of the embodiment of FIGS. 1-3.

On projection 25 there are provided metal seating shoulders 26 and 27 which are embedded in the concrete and are anchored thereto using attachment means such as screws. Headstock 30 rests on shoulders 26 and 27, the headstock being directly and rigidly joined to the supporting body 2 so that in this embodiment the forces arising from the cutting process pass through the concrete body which additionally contributes to improve vibration damping, the damping action being increased by incorporation of projection 25.

As a result of the simple, material saving construction of the track structure as a frame which, is considered by itself, not torsionally stiff, the proportion of concrete making up the lathe bed is increased, resulting in a better utilization of the good internal damping characteristics and the lower material cost of concrete than as hitherto been the case when using concrete in the construction of lathe beds.

Further, the construction of the frame box-shaped sides and column guides permits the economic manufacture of bed lengths of different dimensions and permits the use of tool magazines arranged on the slides and which enclose the column guides.

While certain advantageous embodiments have been chosen to illustrate the invention, it will be understood by those skilled in the art that various changes and modifications can be made therein without departing from the scope of the invention as defined in the appended claims.

What is claimed is:

1. A lathe bed comprising
    a concrete supporting body having spaced apart wall portions integrally formed thereon;
    a generally rectangular frame having two side members at opposite ends thereof, said frame including means extending between side members defining parallel track members for supporting and guiding a tool carrier,
    said track members being fixedly connected to both of said end members,
    said frame being torsionally flexible when apart from said support body; and
    means for rigidly connecting said side members of said frame to said spaced apart wall portions of said body to render said frame substantially torsionally inflexible.

2. A lathe bed according to claim 1 wherein said side members comprise
    first and second elongated box-shaped side members fixedly attached to said body;
    and said track members comprise
    first and second column guide members extending between and fixedly attached to said side members.

3. A lathe bed according to claim 2 wherein one of said column members is mounted substantially above the other, and wherein said body is dimensioned to extend upwardly to at least the height of the upper one of said column members.

4. A lathe bed comprising
    a concrete supporting body having first and second spaced-apart wall portions integrally formed thereon;
    a generally rectangular frame having two ends, said frame including
        an elongated box-like side member at one end of said ends, and
        first and second parallel column guide members fixedly attached at one end to said side member and extending perpendicularly from said side member for supporting and guiding a tool carrier,
        said frame being torsionally flexible when apart from said body; and
    means for fixedly attaching said side member to said first one of said spaced-apart wall portions,
        the other end of each of said column members being directly and fixedly attached to said second one of said wall portions on said body to render said frame substantially torsionally inflexible.

5. A lathe bed according to claim 4 wherein one of said column members is mounted substantially above the other, and wherein said body is dimensioned to extend upwardly to at least the height of the upper one of said column members.

* * * * *